United States Patent [19]

Gilino

[11] Patent Number: 5,072,111
[45] Date of Patent: Dec. 10, 1991

[54] OPTICAL TIME DOMAIN REFLECTOMETER CALIBRATION SYSTEM

[75] Inventor: Gary D. Gilino, Huntsville, Ala.

[73] Assignee: The United States of America as represented by the Secretary of the Army, Washington, D.C.

[21] Appl. No.: 576,911

[22] Filed: Sep. 4, 1990

[51] Int. Cl.$^5$ .............................................. H01J 5/16
[52] U.S. Cl. ............................... 250/227.15; 356/73.1
[58] Field of Search ....................... 250/227.12, 227.14, 250/227.15, 227.16, 227.18, 227.19, 227.23, 252.1 A; 356/73.1

[56] References Cited

U.S. PATENT DOCUMENTS 4,952,057 8/1990 Kamikawa et al. ................. 356/73.1

OTHER PUBLICATIONS

"Verifying OTDR Calibration Quickly" by Robert Rickenbach and Erwin R. Wechsler; Lasers and Applications, Feb. 1985, pp. 77-82.

"Group Index and Time Delay Measurements of a Standard Reference Fiber" by B. L. Danielson and C. D. Whittenberg, Jul. 1988.

"Proposed Procedures for Characterizing OTDR Loss and Distance Measurement Accuracy", Bellcore, Jun. 2, 1989, pp. 1-4.

Primary Examiner—David C. Nelms
Assistant Examiner—John R. Lee
Attorney, Agent, or Firm—Freddie M. Bush; Howard G. Garner

[57] ABSTRACT

An optical time domain reflectometer calibration system for use with an optical time domain reflectometer to check for accuracy of the optical time domain reflectometer in absolute and relative distance measurements as well as for attenuation measurements and receiver linearity.

4 Claims, 1 Drawing Sheet

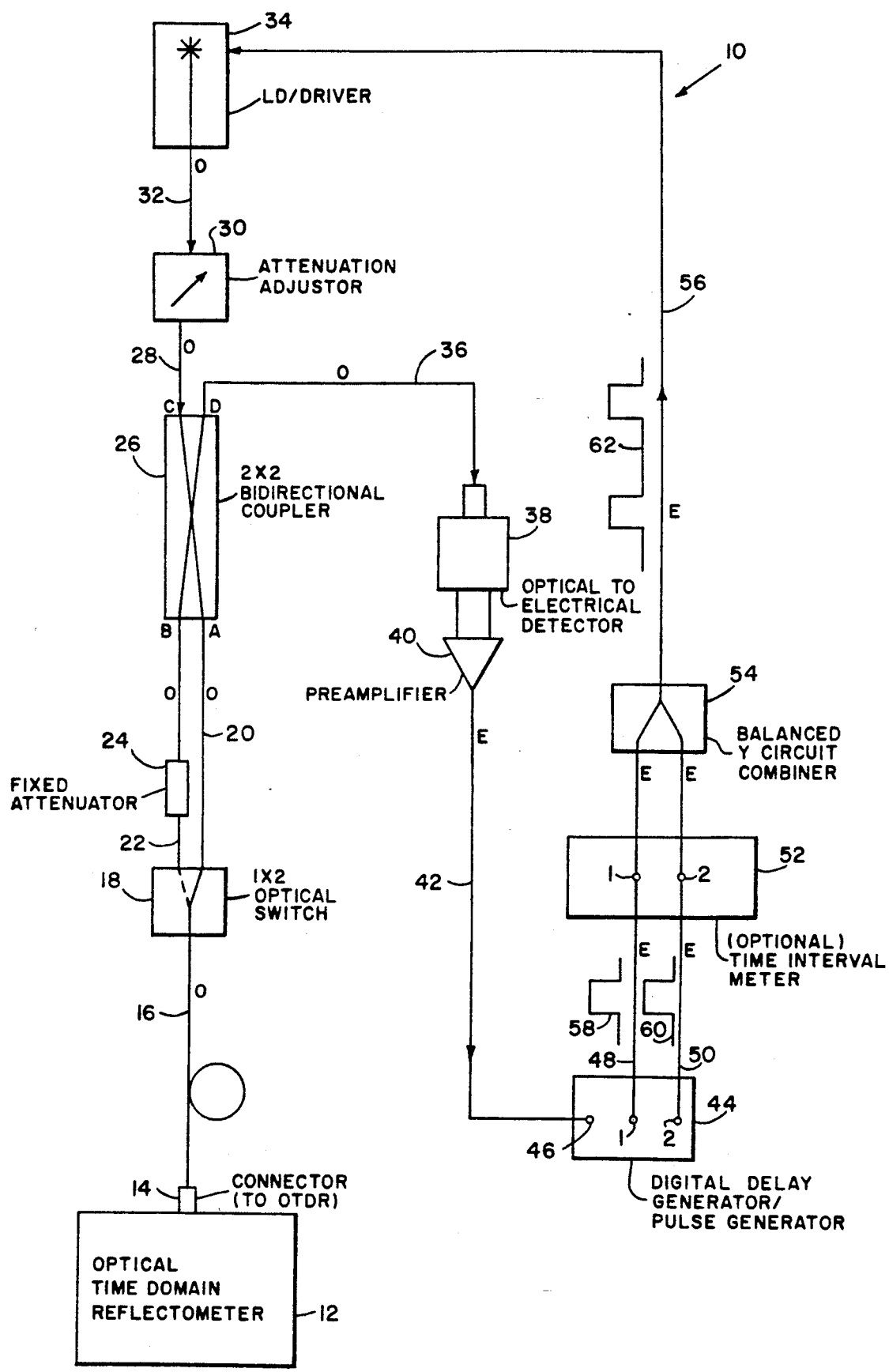

OPTICAL TIME DOMAIN REFLECTOMETER CALIBRATION SYSTEM

DEDICATORY CLAUSE

The invention described herein may be manufactured, used, and licensed by or for the Government for governmental purposes without the payment to me of any royalties thereon.

BACKGROUND OF THE INVENTION

Optical time domain reflectometers (OTDR) have been utilized for some time to perform various measurement, diagnostic and monitoring functions on optical fibers and optical fiber systems. However, industry consensus calibration standards for OTDR have not yet been finalized. The International Electrotechnical Commission is addressing this issue and is initially focusing its effort on developing standard calibration procedures for the principal parameters that the OTDR measures. These parameters are generally agreed to be absolute and relative distance measurements and attenuation (loss) measurement. Ideally, the characterization of the OTDR's ability to accurately measure these parameters should be performed over the entire dynamic range of the instrument being tested.

Passive and active OTDR calibration methods have been proposed by the optical fiber community with good cases being made for both general approaches. The advantages and disadvantages of particular methods have been discussed by many in the field. The variety, application and technological diversity of the OTDR seem to indicate that no one OTDR calibration method is suitable for all situations. However, there is a need for a system that makes it possible to accurately measure the general parameters of measurement of the OTDR that a majority of the community can use to check or calibrate an OTDR.

SUMMARY OF THE INVENTION

Accordingly, it is an object of this invention to provide an optical time domain reflectometer calibration system (OTDRCS) that enables one to accurately measure absolute and relative distances as well as attenuation (loss) measurement.

Another object of this invention is to provide an active OTDR characterization/calibration system.

Still another object of this invention is to provide a reliable and safe OTDRCS that can be fabricated and is inexpensive for both military and commercial application.

A still further object of this invention is to provide a system that is user-friendly, fast and incorporates features that allow a variety of skill level personnel to use it.

A still further object of this invention is to provide a system that has accuracy and flexibility so as to function effectively with as many types and styles of OTDR's as possible.

Other objects and advantages of this invention will be obvious to those skilled in this art.

In accordance with this invention, an optical time domain reflectometer calibration system (OTDRCS) is provided in which an optical pulse from an OTDR is utilized in the system by passing the optical pulse to a detector that converts the optical pulse to an electrical output that is utilized for triggering a delay generator at a particular time and for producing two time-delayed electrical pulses that are combined and used to drive a laser diode/driver to produce two optical outputs that are fed back to the OTDR in a predetermined time delay and attenuation and are utilized to characterize the performance of the OTDR by comparing the calculated values with values measured by the OTDR.

BRIEF DESCRIPTION OF THE DRAWING

The single FIGURE of the drawing is a schematic illustration of the optical time domain reflectometer calibration system in accordance with this invention.

DETAILED DESCRIPTION OF THE INVENTION

Referring now to the drawing, an optical time domain reflectometer calibration system (OTDRCS) 10 constructed in accordance with this invention is designed to be used with a conventional optical time domain reflectometer 12. An optical time domain reflectometer calibration system 10 includes a fiber optic connector 14 that is attached in a conventional manner to the input/output port of OTDR 12. A connector 14 is connected to optical fiber 16 at one end and to an optical switch 18 at the opposite end. Optical switch 18 has one input/output on its first side adjacent to fiber 16 and two input/outputs on the other side with switch 18 being capable of switching the input/output on the first side to either of the input/outputs on the other side as desired. One input/output of switch 18 on the other side is connected to an optical fiber 20 and the other input/output is connected to an optical fiber 22, that has a fixed attenuator 24 connected therein with one end of optical fiber 22 being connected at switch 18 and the other end being connected to port B of a two x two bidirectional coupler 26. Fiber 20 has one end connected to optical switch 18 and the other end connected to port A of two X two bidirectional optical coupler 26. Bidirectional optical coupler 26 has ports C and D, with port C being connected to optical fiber 28 through an adjustable attenuator 30 and optical fiber 32 to laser diode/driver (LD) 34. Port D of bidirectional optical coupler 26 is connected by an optical fiber 36 to an optical detector 38 that detects an optical signal and converts it to an electrical signal. The output from optical detector 38 is connected to pre-amplifier 40 which amplifies the electrical signal, and pre-amplifier 40 is connected by an electrical lead 42 to a digital delay generator/pulse generator 44 to provide an electrical trigger pulse to the digital delay generator/pulse generator (DDG/PG) 44 which is of conventional structure such as model DG535 sold by Stanford Research Inc.

Digital delay generator/pulse generator 44 produces precisely delayed output electrical pulses (with respect to the trigger pulse received) at input 46. The output electrical pulses produced by generator 44 are connected at outputs 1 and 2 to leads 48 and 50, that, in turn, are connected through a time interval meter 52 and to a balanced Y circuit combiner 54. Balanced Y circuit combiner 54 is a conventional combiner that combines the two pulses received from the digital delay generator/pulse generator 44, and can be of any conventional structure for performing this function such as one with diodes, with a transformer type structure, or any other structure that performs this function. Balanced Y circuit combiner 54 is connected by lead 56 to laser diode/driver 34 for utilizing the electrical pulses received from generator 44 to modulate the laser diode/driver to produce optical pulses that are precisely spaced with the same time delay as the electrical pulses produced by the digital delay generator/pulse generator 44.

It is noted that the optical fibers in this system are designated with the letter "O" by the side thereof and the electrical leads for the electrical portion of the system are designated with the letter E beside each of the leads. Square wave output pulses 58 and 60, from outputs 1 and 2 are combined by balanced Y circuit combiner 54 to produce the two square wave pulses as illustrated at 62 with the first and second outputs accurately spaced as manually adjusted from pulse generator 44. Time interval meter 52 is optionally provided in this electrical circuit to accurately check the spacing between square wave pulse 58 and square wave pulse 60 to more accurately determine the exact spacing of these pulses even though delay generator 44 spaces the pulses rather accurately.

In operation, when it is desired to check an OTDR such as 12, the OTDR is turned on and the OTDR produces output optical pulses at a specific repetition rate depending upon the distance that the OTDR is designed to measure. With the desire to check the accuracy of an OTDR 12, the OTDR is manually turned on with a circuit activated to cause the OTDR 12 to produce an optical pulse that goes through optical fiber 16, optical switch 18 (which is in either of two positions) and exits switch 18 through optical fiber 20 or 22 depending upon the particular position of optical switch 18, thence to bidirectional optical coupler 26 via fiber port A or B depending upon the position of optical switch 18 transmitting the optical pulse. Bidirectional optical coupler 26 splits the input so that regardless of which input port A or B is used, a portion of the input goes out of port C to fiber 28 and a portion goes out port D to fiber 36. The pulse portion going out through optical fiber 36 is inputted to optical detector 38. Optical detector 38 is capable of responding to the portion of the optical pulse transmitted through optical fiber 36 whether the pulse comes through fiber 20 or through fiber 22 that has attenuator 24 therein. That is, when the optical pulse passes through attenuator 24, there will still be a sufficient amount out through optical fiber 36 to activate optical detector 38.

Optical detector 38 then converts the detected pulse to an electrical pulse that is amplified by pre-amplifier 40 and the output of pre-amplifier 40 is used to externally trigger digital delay/pulse generator 44 so that the OTDR calibration system 10 is synchronized with the OTDR 12 outgoing pulse. Digital delay generator/pulse generator 44 produces precisely delayed output electrical pulses with respect to the trigger pulse from pre-amplifier 40. Output electrical delayed pulses from channels 1 and 2 of digital delay generator/pulse generator 44 can be manually adjusted with respect to the trigger pulse and to each other as desired. The delay time between output from channels 1 and 2 can be optionally measured precisely by using time interval meter 52 even though digital delay generator/pulse generator 44 produces precision timed square pulses 58 and 60. The two delayed pulses 58 and 60 from outputs 1 and 2 of delay generator 44 are combined in a single electrical cable 56 using a balanced Y circuit combiner 54 and the delay between pulses 58 and 60 is maintained as illustrated at 62 so that these pulses can be used to modulate laser diode/driver 34 to cause diode/driver 34 to produce optical pulses that are spaced the same distance as electrical pulses 58 and 60 from digital delay generator/pulse generator 44.

These two optical pulses from laser diode/driver 34 have the same delay between them as the two electrical pulses 58 and 60 and are outputted through fiber 32 with adjustable attenuator 32 being used to adjust the appropriate level of the pulses. The optical pulses are then transmitted through fiber 28 to port C of bidirectional optical coupler 26 via ports A or B and fibers 20 and 22 to optical switch 18. Depending upon the position of switch 18, either the pulses through fiber 20 or 22 are transmitted through fiber 16 to OTDR 12 where the two pulses are displayed on the screen of the OTDR and the OTDR can then be used to measure absolute or relative distance measurement as well as relative attenuation. That is, OTDR 12 is designed to calculate the distance traveled in an optical fiber based on the time it takes for the optical pulse leaving OTDR 12 to return as one of the pulses from laser diode 34. That is, the OTDR converts time to distance, and calculates this distance measurement. By switching in or out fixed attenuator 24 by optical switch 18, and adjusting optical output level of LD/driver 34 with adjustable attenuator 30, relative attenuation accuracy and optical receiver linearity of the OTDR can be determined by the OTDR using its cursors and internal measurement capability. The portion of the original OTDR 12 pulse that was transmitted through fiber 16 and bidirectional coupler 26 splits the pulse into a portion going out port D to detector 38 with the other portion of the pulse going out port C to fiber 28 and attenuator 30. The portion that goes out of port C to fiber 28 is attenuated and dissipated and does not interfere with the two pulses that are later produced at laser diode/driver 34 because of the non-coherance of the LD 34 and the LD in OTDR 12. Also, the portion of the two pulses coming from laser diode/driver 34 to bidirectional coupler 26 and out ports A and B to switch 18 does not cause any interference and the portion that goes out through A or B that is not connected to fiber 16 is dissipated and does not interfere with the pulses desired.

MEASUREMENT PRINCIPLES

EXAMPLES

I. Absolute Distance Measurement

To calculate the length, L, of a fiber by measuring the time delay $Td(\lambda)$ of an optical pulse of wavelength, $\lambda$, transmitted one way through a fiber of effective index of refraction $N(\lambda)$, the relation is, $$L = \frac{C\, Td(\lambda)}{N(\lambda)}, \quad (1)$$

Where C is the velocity of light and taken to be $3.00 \times 10^8$ m/s for the calculations here. $C/N(\lambda)$ is the group velocity. This relation is adapted for use with active OTDRCS circuit 10 in the following way for distance measurement, $$L = \frac{C[(Td_2 - Td_1) + T_{ID}]}{2N}, \quad (2)$$

where $Td_1$ and $Td_2$ are time delays to the leading edges of the two output pulses from DDG/PG 44 and $T_{ID}$ is the insertion delay of the particular OTDRCS 10. Since OTDRCS 10 is a "fiberless" calibration system, that is a system that does not require a calibrated test fiber, the terms $Td_1$, $Td_2$, and C/N are no longer dependent on the wavelength. The relation is divided by two to account for the two way time travel (out and back) through the fiber for which OTDR 12 automatically compensates. OTDR 12 absolute distance measurement is defined as the measured distance from OTDR 12 front panel optical fiber connector to any location beyond this point. The delay of $Td_1$ is manually set to be zero with the DDG/PG 44 so relation (2) becomes, $$L_{ABS} = \frac{C[Td_2 + T_{ID}]}{2N} \quad (3)$$

where $T_{ID}$ is the insertion delay of OTDRCS 10. The value of $T_{ID}$ for OTDRCS 10 can be measured using a calibrated OTDR or by using a circuit to accurately measure the timing between the two resultant pulses with an oscilloscope or by a more accurate measurement method using a time interval meter to measure the time interval between the two pulses. The $T_{ID}$ once measured remains constant over a long period provided the same interconnecting electrical/optical cables are used for OTDRCS 10.

The procedure for using applicant's OTDRCS 10 to make absolute distance measurements is as follows:

(a) First N is chosen and then $Td_2$ is chosen to give desired $L_{ABS}$ from relation (3).

(b) The time delay, $Td_2$, to the leading edge of the second output pulse is manually set with the DDG/PG 44. Adjustable attenuator 30 is adjusted so the optical pulses are not clipped. The pulse width is set with the DDG/PG 44 to produce on OTDR 12 a clearly defined sharp square wave pulse.

(c) The other pulse output channel of the DDG/PG 44 is manually set for zero delay to the leading edge.

(d) OTDR 12 is adjusted to display N from step (a).

(e) With OTDR 12 set for optimum distance resolution, the cursor of the OTDR is adjusted to the leading edge of the second square pulse displayed on the trace. The distance measured by the OTDR is $L_{ABSM}$.

(f) $L_{ABSM}$ and $L_{ABS}$ are compared, with $L_{ABS}$ as the true value.

II. Relative Distance Measurement

OTDR 12 relative distance measurement is defined as the measured distance between two points, neither of which is at the OTDR front panel optical fiber connector 14. In making relative distance measurements with OTDRCS 10, the insertion delay $T_{ID}$, in (3) becomes unnecessary, but the value $Td_1$ can no longer be zero. The latter requirement is by definition and is necessary to place the first pulse beyond the OTDR 12 dead zone so that it may be seen on the OTDR 12 display. The relationship for relative distance measurement is:

$$L_{REL} = \frac{[Td_2 - Td_1]}{2N} \quad (4)$$

where $Td_2$ is greater than $Td_1$.

The procedure for using OTDRCS 10 to make relative distance measurements is as follows:

(a) The value N is selected, then $Td_1$ and $Td_2$ are chosen to give the desired $L_{REL}$ using equation (4).

(b) The time delays, $Td_1$ and $Td_2$, to the first and second pulses respectively are manually set with the DDG/PG 44. Adjustable attenuator 30 is adjusted so the pulses are not clipped. The pulse width is manually set with the DDG/PG 44 to produce on OTDR 12 clearly defined, sharp square wave pulses.

(c) OTDR 12 is adjusted to display N from step (a).

(d) With OTDR 12 set for optimum distance resolution, cursors of OTDR 12 are set to make the distance measurement between the leading edge of the two pulses. The distance measured by OTDR 12 is $L_{RELM}$.

(e) $L_{REL}$ and $L_{RELM}$ are compared with $L_{REL}$ as the true value.

III. Attenuation (Loss) Measurement

OTDRCS 10 uses a stable LD 34, adjustable attenuator 30 and switchable fixed attenuator 24 to perform attenuation and non-linearity measurements. Changing the optical output power of OTDRCS 10 by a fixed amount of attenuation, A, in dB, is by toggling optical switch 18 and is measured with an optical power meter connected to optical connector 14. This results in two relative power levels in dBm where $P_O$ is the power with the attenuation out and $P_I$ is the power with the attenuation in. The fixed attenuation, A, in dB, is $P_O - P_I$ Calibration in this manner of the fixed attenuator optical system accounts for the fixed attenuator as well as all the other attenuation contributions such as splice and connector losses and insertion losses of optical components.

Ideally, OTDR 12 should measure an attenuation difference of A/2 dB when OTDRCS 10 fixed attenuation, A dB is toggled in and out. Halving of the attenuation, A, results from the automatic compensation of OTDR 12 to read one-way attenuation when measuring an optical fiber. Nonlinearity of the OTDR 12 receiver is characterized by performing an overlapping series of attenuation measurements for the OTDR's effective dynamic range, and has the following units:

$$\frac{dB(\text{nonlinearity worst case})}{dB(\text{dynamic range})}$$

It may also be useful to measure nonlinearity over segments shorter than the effective dynamic range. The procedure for making the relative attenuation measurement and nonlinearity characterization with OTDRCS 10 is as follows:

(a) Put OTDR 10 in the mode to make attenuation measurement.

(b) With the fixed attenuation 24 toggled out, adjust the peak of the pulse to be just below the clipping level using the adjustable attenuator 30.

(c) Position the cursor of OTDR 10 as required to measure the pulse peak with respect to a fixed attenuation level at the noise floor. Let this value be $H_O$.

(d) Toggle the fixed attenuation in.

(e) Position the cursor of OTDR 10 as required to measure the new pulse with respect to the same fixed attenuation level of step (c). Let this value be $H_I$ and let OTDR measured attenuation be $(A/2)m$, which equals $H_O - H_I$.

(f) Subtract $(A/2)m$ from $A/2$. Record the result. This value is the nonlinearity in dB.

(g) Toggle the fixed attenuation 24 out again.

(h) Adjust the peak of the pulse with adjustable attenuator 30 to a nominal halfway point between the two previous levels $H_O$ and $H_I$.

(i) Repeat steps (c) through (h) until the peak of the pulse is at a level slightly above the noise floor with the fixed attenuation 24 in so that the effective dynamic range of the OTDR is measured and the worst case nonlinearity is determined.

As will be appreciated, an active system is provided in which one is enabled to check an OTDR 12 for accuracy using a combination optical and electrical system such as illustrated at 10.

I claim:

1. A system for calibrating an optical time domain reflectometer (OTDR) having a screen, comprising:

a) fiber optic connector means having one end connected to said OTDR for receiving optical pulses from said OTDR for calibration purposes;

b) optical switch means connected to the other end of said fiber optic connector for receiving said optical pulses and for transmitting said pulses in alternate paths;

c) a two-by-two bidirectional coupler disposed to receive said optical pulses transmitted in either of said paths by said optical switch means and for splitting said pulses into two streams;

d) means for receiving one of said streams of optical pulses and for converting said stream of optical pulses into an electrical triggering signal having electrical pulses comparable to said optical pulses;

e) amplifier means for receiving and amplifying said electrical triggering signal;

f) means for transmitting said amplified electrical triggering signal;

g) digital delay pulse generator means for receiving said amplified electrical triggering signal to trigger said generator means to produce two delayed output signals, each containing spaced electrical pulses correlated with said electrical triggering signal;

h) balanced Y circuit means for combining said two delayed output electric signals into a single electric signal wherein said spaced electric pulses are correlated with each other and with said triggering signal and have the same time delay as the electrical pulses produced by said digital delay pulse generator;

i) laser diode/driver means disposed to receive said single electric signal from said balanced Y circuit means and for converting said single electric signal into an optical signal having spaced optical pulses having the same time delay as the electrical pulses produced by said pulse generator; and j) means for transmitting said optical signal to said OTDR wherein said signal is displayed on the screen thereof for comparison purposes and for calculating the relative distance between said spaced pulses in order to determine the accuracy of said OTDR calibration.

2. A calibration system as set forth in claim 1, wherein one of said paths in which said optical pulses are transmitted by said optical switch means includes a fixed attenuator means.

3. A calibration system as set forth in claim 1, wherein said means for transmitting said optical signal to said OTDR comprises means for adjusting the attenuation is said optical signal.

4. A calibration system as set forth in claim 1, further comprising a time interval meter disposed between said digital delay pulse generator means and said balanced Y circuit means for registering the time interval between the said pulses in said two delayed output signals.

* * * * *